Aug. 6, 1940.   T. O. KOSATKA   2,210,723
EXTERNAL OIL SEAL
Filed Feb. 6, 1939

INVENTOR.
Thomas O. Kosatka,
BY Parkinson & Lane
ATTORNEYS

Patented Aug. 6, 1940

2,210,723

UNITED STATES PATENT OFFICE 2,210,723

EXTERNAL OIL SEAL

Thomas O. Kosatka, Chicago, Ill., assignor to Victor Manufacturing & Gasket Company, Chicago, Ill., a corporation of Illinois Application February 6, 1939, Serial No. 254,814

1 Claim. (Cl. 288—3)

The present invention relates to an external oil seal adapted to effectively seal the opening or space provided between relatively rotatable machine parts or elements such as a rotatable shaft and its surrounding housing or enclosure. In the disclosed embodiment, the sealing element is shown as mounted upon and rotatable with the shaft, and the shell therefor is mounted upon the surrounding housing whereby the sealing lip rotates with the shaft and forms a sealing contact with its enclosing shell.

Due to the novel construction and arrangement of parts, leakage or passage of lubricant or other fluid is effectively prevented, for in order to by-pass the seal, such fluid must take a tortious path before reaching the sealing lip which is maintained in frictional contact under any and all conditions of operation. It is, therefore, an important object of the present invention to provide a novel combination of sealing element and encompassing shell in which the sealing contact occurs between the sealing element and shell.

Another important feature of the present invention is the provision of a novel seal construction in which the sealing element rotates relative to its enclosing shell or retainer, and thereby eliminating frictional contact between the seal construction and the shaft or its enclosing housing.

The invention further resides in the combination, construction and arrangements of parts illustrated in the accompanying drawing, and while there is shown therein a preferred embodiment, it is to be understood that the same is susceptible of modification and change and comprehends other details and constructions without departing from the spirit of the invention.

Figure 1:
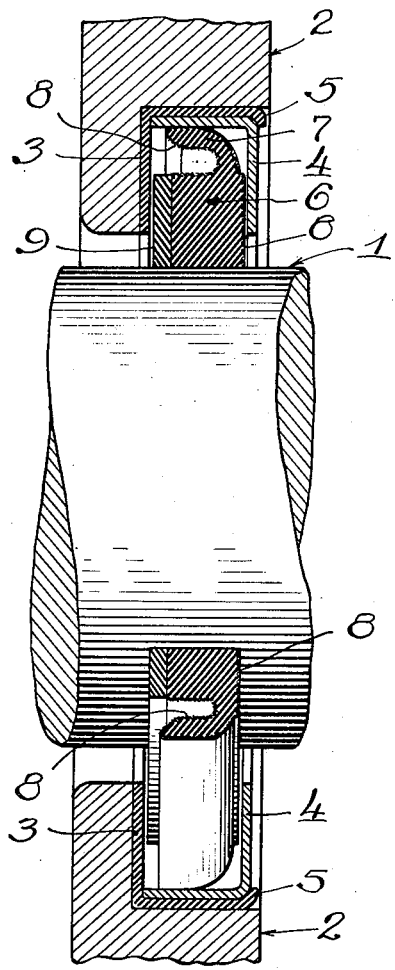
Figure 1 is a view in vertical cross-section through the novel seal construction and housing surrounding the drive shaft.

Referring more particularly to the disclosure in Figure 1 of the drawing, the novel seal construction is shown associated with a rotatable shaft 1 and a housing or casing 2 surrounding the shaft. In this illustrative embodiment of the invention, the novel seal comprises a sectional shell or retainer formed of an outer section 3 and an inner section 4, with the outer section having its end turned down as at 5 to secure the sections together.

Within the shell or retainer is rotatably mounted a sealing element comprising a member 6 formed with an off-set lip 7. This member is preferably constructed of an elastic plastic material such as a synthetic rubber of the class including polymerized butadiene, polymerized chloroprene, rubber hydrochloride or polyethylene sulfide. This plastic material is suitably covered by means of a fabric layer 8 such as cotton duck or other fibrous material suitable for the purpose.

In order to enhance the abrasive and frictional resistance, the sealing or contacting portion of the fabric covering is loaded with graphite. A reinforcing metal washer 9 is secured to one face of the sealing element and this metal washer, fabric covering and plastic material are molded or vulcanized to form an integral sealing member which is mounted with a pressed fit upon the shaft.

It will be readily apparent from Figure 1 that in this illustrative embodiment, the sides of the sealing element are spaced the necessary distance from the side walls of the sections 3 and 4 of the retainer so as to permit free rotation of the shaft and sealing element relative to the retainer and housing or casing 2. The sealing surface of the lip 7 has a frictional or wiping contact with the interior of the inner section 4 and that contact is maintained regardless of the speed of rotation of the shaft and sealing element. In fact, in this type of construction, no spring or tension member is required to maintain the sealing lip in frictional contact at high speeds due to the centrifugal action.

Figure 2:
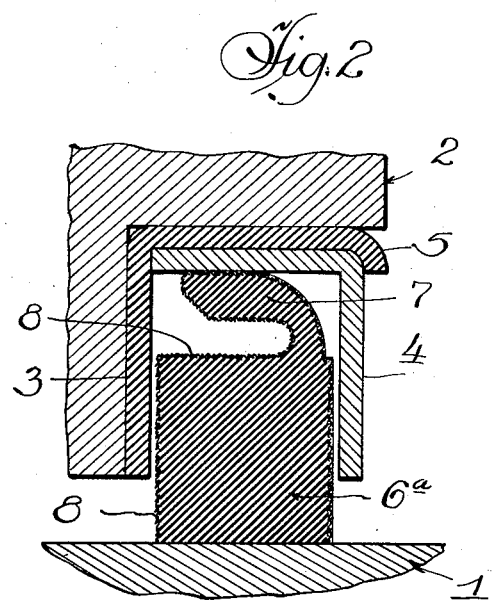
Figure 2 is an enlarged fragmentary view in vertical cross-section of an alternate construction.

Figure 2 discloses an alternate construction of sealing element 6a. In this form of the invention, the sectional shell or retainer and the sealing element is identical in construction with the exception that the washer 9 has been omitted.

Figure 3:
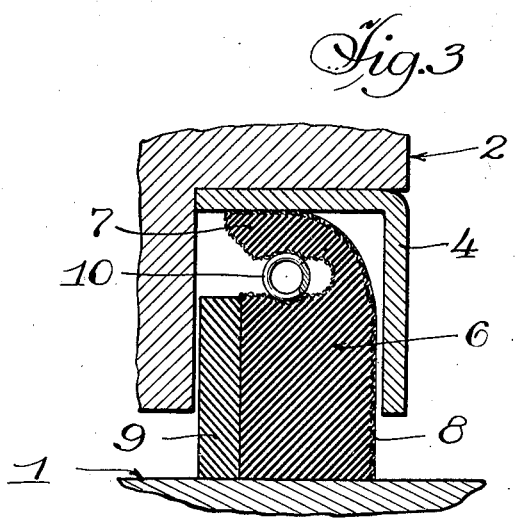
Figure 3 is a fragmentary view similar to Figure 2 but of a further modification.

In Figure 3 there is disclosed a further modification in which the outer shell of the retainer of Figure 1 has been omitted. The sealing element is identical with that in Figure 1 but an expansible or garter spring 10 is shown as provided, although as stated above, due to the elastic or resilient construction of the lip and the action of centrifugal force, the spring is usually not essential to the proper operation of the seal.

It will be apparent from the above disclosure that the elastic sealing element and its surrounding shell form a unit assembly which may be mounted and is equally efficient when mounted upon the shaft and its surrounding housing from either side or in either direction. Due to its novel construction and sealing area, oil, grease, water, dust and other fluids are effectively sealed against passage. Also the novel construction of the elastic sealing element is so constructed that its inner circumference is pressed upon the shaft and its outer circumference forms the sealing surface which is maintained in frictional contact with the enclosing shell or surrounding housing. The seal has universal application adapted for various types of installations and purposes.

Having thus disclosed the invention, I claim:

An external oil seal adapted to seal the space between a shaft and its surrounding structure against the escape or passage of lubricant, water, dust and other fluids, comprising an assembly including a channel-shaped retaining shell to be mounted in the surrounding structure, an elastic sealing element to be mounted upon the shaft and provided with an external sealing lip in expanding wiping contact with the interior of the shell, and a reinforcing washer bonded to said sealing element.

THOMAS O. KOSATKA.